US011477230B2

(12) United States Patent
Baughman et al.

(10) Patent No.: US 11,477,230 B2
(45) Date of Patent: Oct. 18, 2022

(54) HOME AUTOMATION RISK ASSESSMENT AND MITIGATION VIA MACHINE LEARNING

(71) Applicant: International Business Machines Corporation, Armonk, NY (US)

(72) Inventors: Aaron K. Baughman, Cary, NC (US); Raghuveer Prasad Nagar, Kota (IN); Shikhar Kwatra, Durham, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 16/819,242

(22) Filed: Mar. 16, 2020

(65) Prior Publication Data

US 2021/0288988 A1   Sep. 16, 2021

(51) Int. Cl.
*G06N 20/00*     (2019.01)
*H04L 9/40*      (2022.01)
*G06F 16/2457*   (2019.01)
*G06N 5/04*      (2006.01)
(Continued)

(52) U.S. Cl.
CPC .... *H04L 63/1433* (2013.01); *G06F 16/24573* (2019.01); *G06N 5/04* (2013.01); *G06N 20/00* (2019.01); *G16Y 10/80* (2020.01); *G16Y 30/10* (2020.01)

(58) Field of Classification Search
None
See application file for complete search history.

(56) References Cited

U.S. PATENT DOCUMENTS 10,827,335 B1\*  11/2020  Trim .................. H04W 4/90
2019/0303235 A1  10/2019  Chittigala
2021/0019640 A1\*  1/2021  Kim .................. G06N 3/0454
(Continued)

FOREIGN PATENT DOCUMENTS

CN       102594911 A       7/2012
CN       104618464 A       5/2015
(Continued)

OTHER PUBLICATIONS

"IOT in Disaster Management: Saving Lives With Early Warnings", Internet of Things, p. 6, Place of publication and year: Bonn, 2015, <https://10innovations.alumniportal.com/internet-of-things/iot-in-disastermanagement-saving-lives-with-early-warning.html>.
(Continued)

*Primary Examiner* — Cai Y Chen
(74) *Attorney, Agent, or Firm* — Monchai Chuaychoo

(57) ABSTRACT

An approach for identifying mitigation solution based on critical situations is disclosed. The approach includes detecting one or more critical situations associated within a structure and detecting one or more location of one or more users in the structure. The approach retrieves a user-knowledge corpus based on one or more smart IoT devices or from existing database. Furthermore, the approach retrieves a critical situation knowledge corpus from various servers and creates risk mitigation action plans to address the one or more critical situations. The approach selects an optimal plan, by leveraging machine learning through combinatorial optimization technique, from the existing risk mitigation action plans and executing the optimal plan.

17 Claims, 4 Drawing Sheets

(51) Int. Cl.
 *G16Y 10/80* (2020.01)
 *G16Y 30/10* (2020.01)

(56) References Cited

U.S. PATENT DOCUMENTS

2021/0185074 A1* 6/2021 Fitzgerald ............... H04W 4/02
2021/0248441 A1* 8/2021 Sundararajan ......... G01R 15/20

FOREIGN PATENT DOCUMENTS

| | | |
|---|---|---|
| CN | 103550892 B | 4/2016 |
| CN | 106178367 A | 12/2016 |
| CN | 106527309 A | 3/2017 |
| CN | 107123230 A | 9/2017 |
| CN | 108510693 A | 9/2018 |
| CN | 108648124 A | 10/2018 |
| KR | 101755533 B1 | 7/2017 |
| KR | 20190063729 A | 6/2019 |

OTHER PUBLICATIONS

Soubhagyalaxmi et al., "Disaster Management System Using IOT", © 2018 IJRTI | vol. 3, Issue 6 | ISSN: 2456-3315, 7 pages, <http://www.ijrti.org/papers/IJRTI1806029.pdf>.

* cited by examiner

HOME AUTOMATION RISK ASSESSMENT AND MITIGATION VIA MACHINE LEARNING

BACKGROUND

The present invention relates generally to the field of security management system, and more particularly, to IoT based security management system leveraging machine learning.

IoT devices, typically are nonstandard computing devices that connect wirelessly to a network and have the ability to transmit data back and forth. IoT devices involves extending internet connectivity beyond standard devices (e.g., desktops, laptops, smartphones, etc.) to non-internet-enabled physical devices and everyday objects.

Home automation system equipped with IoT devices can receive user's command, analyze cognitive state, and accordingly executes action in one or more devices, or provides appropriate information to the user. In addition, home automation system may include security features such as access control, fire and smoke detection, and alarm components.

SUMMARY

Aspects of the present invention disclose a computer-implemented method, computer program product, and computer system for identifying mitigation solution based on critical situations. The computer implemented method includes: detecting one or more critical situations associated within a structure; detecting one or more location of one or more users in the structure; retrieving a user-knowledge corpus based on one or more smart IoT devices from a first database; retrieving a critical situation knowledge corpus from a second database; creating one or more risk mitigation action plans to address the one or more critical situations; selecting an optimal plan, by leveraging machine learning through combinatorial optimization technique, from the one or more risk mitigation action plans; and executing the optimal plan.

In another embodiment, the computer program product includes one or more computer readable storage media and program instructions stored on the one or more computer readable storage media, the program instructions comprising: program instructions to detect one or more critical situations associated within a structure; program instructions to detect one or more location of one or more users in the structure; program instructions to retrieving a user-knowledge corpus based on one or more smart IoT devices from a first database; program instructions to retrieve a critical situation knowledge corpus from a second database; program instructions to create one or more risk mitigation action plans to address the one or more critical situations; program instructions to select an optimal plan, by leveraging machine learning through combinatorial optimization technique, from the one or more risk mitigation action plans; and program instructions to execute the optimal plan.

In another embodiment, the computer system includes one or more computer processors; one or more computer readable storage media; program instructions stored on the one or more computer readable storage media for execution by at least one of the one or more computer processors, the program instructions comprising: program instructions to detect one or more critical situations associated within a structure; program instructions to detect one or more location of one or more users in the structure; program instructions to retrieving a user-knowledge corpus based on one or more smart IoT devices from a first database; program instructions to retrieve a critical situation knowledge corpus from a second database; program instructions to create one or more risk mitigation action plans to address the one or more critical situations; program instructions to select an optimal plan, by leveraging machine learning through combinatorial optimization technique, from the one or more risk mitigation action plans; and program instructions to execute the optimal plan.

DETAILED DESCRIPTION

Figure 1:
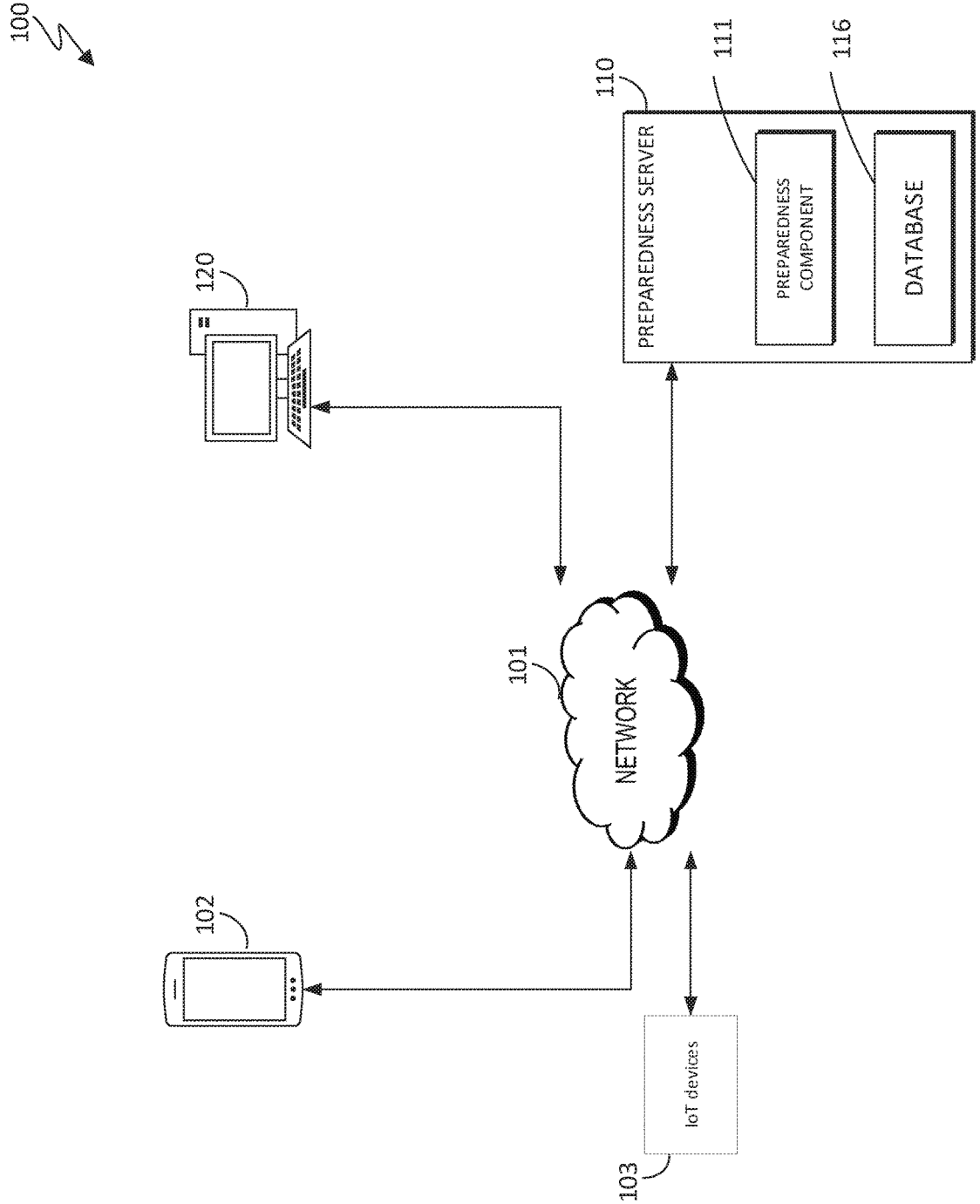
FIG. 1 is a functional block diagram illustrating a topology of a preparedness environment, designated as 100, in accordance with an embodiment of the present invention.

Embodiments of the present invention provides an approach for averting critical situations (e.g., natural disaster, man-made disaster, medical emergency, etc.) in an IoT (Internet of Things) equipped structure (e.g., home, office, etc.) by leveraging artificial intelligence. The approach may predict critical situations based on IoT sensors and device and devise one or more risk mitigation strategies based on i) use specific data and ii) corpus related to general knowledge associated with the critical situations. For example, if there is a tornado watch/warning, the embodiment may alert/warn the users of the house and direct each user towards a safe room in the house. Furthermore, embodiment can address i) whether the power backup will have enough power stored, ii) whether drinking water needs to be stored, and iii) certain devices has to be stopped (e.g., turn off water sprinkler system, limit electric usage to the exterior devices, etc.).

Other embodiments may include an artificial intelligence based risk assessment and risk mitigation feature associated with the critical situations. For example, not all IoT devices and/or systems in the building/home may be functioning during a disaster. Hence, the embodiment may leverage combinatorial optimization technique (e.g., knapsack problem, etc.) to determine and execute the optimal solution to the critical situation. For example, during a brush fire, a general knowledge corpus may suggest turning on the sprinkler system to lessen the impact of the heat on the structure. However, the house is not equipped with a water sprinkler system and therefore, embodiment can dynamically adjust one or more mitigation solutions to customize based on the user (e.g., location, etc.), available IoT devices and external changes (e.g., shifting wind pattern causing the fire to go a different direction, etc.).

The following tables illustrates, but not an exhaustive list, some examples of critical situations including first response/action. Table 1 is an example of natural disasters/situations and Table 2 is example of human-made disasters/situations.

TABLE 1

| Example | Profile | First response |
|---|---|---|
| Avalanche | The sudden, drastic flow of snow down a slope, occurring when either natural triggers, such as loading from new snow or rain, or artificial triggers, such as explosives or backcountry skiers, overload the snowpack | Shut off utilities; Evacuate building if necessary; Determine impact on the equipment and facilities and any disruption |
| Flood | Flash flooding: Small creeks, gullies, dry streambeds, ravines, culverts or even low-lying areas flood quickly | Monitor flood advisories; Determine flood potential to facilities; Pre-stage emergency power generating equipment; Assess damage |
| Fire | Forest fires, lightening related fires, brush fires | Monitor wind and other weather related conditions; alert occupants; turn on fire suppression system including sprinklers |

TABLE 2

| Example | Profile | First response |
|---|---|---|
| Bioterrorism | The intentional release or dissemination of biological agents as a means of coercion | Get information immediately from public health officials via the news media as to the right course of action; If you think you have been exposed, quickly remove your clothing and wash off your skin; put on a HEPA to help prevent inhalation of the agent |
| Nuclear and radiation accidents | An event involving significant release of radioactivity to the environment or a reactor core meltdown and which leads to major undesirable consequences to people, the environment, or the facility | Recognize that a CBRN incident has or may occur. Gather, assess and disseminate all available information to first responders. Establish an overview of the affected area. Provide and obtain regular updates to and from first responders. |
| Home invasion | forceful entry to an occupied, private dwelling with intent to commit a violent crime against the occupants | Call the police, lock the door, retreat and hide, use firearms |
| Arson, cooking related fire | Fires caused by inadvertent or intentional means | Alert fire department of location, direct occupants to nearest exit, use fire suppression system, turn on exhaust fan (if equipped) |

A detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

FIG. 1 is a functional block diagram illustrating a topology of a preparedness environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Preparedness environment 100 includes mobile computing device 102, IoT devices 103, preparedness server 110 and online knowledge servers 120.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between preparedness server 110, online knowledge servers 120 and other computing devices (not shown) within preparedness environment 100. It is noted that other computing devices can include, but is not limited to, mobile computing device 102 and any electromechanical devices capable of carrying out a series of computing instructions.

Mobile computing device 102 represents a network capable mobile computing device that may receive and transmit confidential data over a wireless network. Mobile computing device 102 can be a laptop computer, tablet computer, netbook computer, personal computer (PC), a personal digital assistant (PDA), a smart phone, smart watch (with GPS location) or any programmable electronic device capable of communicating with server computers (e.g., preparedness server 110) via network 101, in accordance with an embodiment of the present invention.

IoT device 103 represents a system of interrelated (non-standard or standard) computing devices, mechanical and digital machines, objects, etc., that are provided with unique identifiers (UIDs) and the ability to transfer data over a network (e.g., wireless or wired) without requiring human-to-human or human-to-computer interaction. IoT device can be a smart lighting, smart thermostat, door lock device, home automation/security related device, or any programmable electronic device capable of communicating with server computers (e.g., preparedness server 110) via network 101, in accordance with an embodiment of the present invention.

Preparedness server 110 and online knowledge servers 120 can be a standalone computing device, a management server, a web server, a mobile computing device, or any other electronic device or computing system capable of receiving, sending, and processing data. In other embodiments, preparedness server 110 and online knowledge servers 120 can represent a server computing system utilizing multiple computers as a server system, such as in a cloud computing environment. In another embodiment, preparedness server 110 and online knowledge servers 120 can be a laptop computer, a tablet computer, a netbook computer, a personal computer (PC), a desktop computer, a personal digital assistant (PDA), a smart phone, or any other programmable electronic device capable of communicating other computing devices (not shown) within preparedness environment 100 via network 101. In another embodiment, preparedness server 110 and online knowledge servers 120 represents a computing system utilizing clustered computers and components (e.g., database server computers, application server computers, etc.) that act as a single pool of seamless resources when accessed within preparedness environment 100.

Preparedness server 110 includes preparedness component 111 and database 116.

Online knowledge servers 120 represents a repository of knowledge related to, but is not limited to, i) recognizing critical situations, ii) formulating solutions (action steps/plan) to address the critical situations and iii) executing the solutions.

Preparedness component 111 enables the present invention to recognize/predict critical situations, formulate and execute risk mitigation action plans. Preparedness component 111 will be described in greater details in regard to FIG. 2.

Database 116 is a repository for data used by preparedness component 111. Database 116 can be implemented with any type of storage device capable of storing data and configuration files that can be accessed and utilized by preparedness server 110, such as a database server, a hard disk drive, or a flash memory. Database 116 uses one or more of a plurality of techniques known in the art to store a plurality of information. In the depicted embodiment, database 116 resides on preparedness server 110. In another embodiment, database 116 may reside elsewhere within preparedness environment 100, provided that preparedness component 111 has access to database 116. Database 116 may store information associated with, but is not limited to, corpus knowledge of IoT devices, critical situation awareness, controlling home automation devices, weather forecast, traffic pattern, crowd sourced knowledge, user-based knowledge corpus and critical situation mitigation knowledge corpus.

User-based knowledge corpus are based on usage pattern of the users, considering the types of activities, sequence of activities, types of devices, dependency among the devices, locations of the devices within the building. The user-based knowledge corpus can be user specific or group of users specific in the building. For example, user-based knowledge corpus can be historical pattern and/or usage of family in a home such as i) rooms frequently visit between certain time of the day, ii) television usage, iii) frequency of alerts/detected by the security system sensors and iv) temperature setting.

Critical situation mitigation knowledge corpus includes information associated with critical situations such as best practice, evacuation plan, rescue operational steps, sequences of activities performed on different types of rescue operation or addressing any critical situations, actions on various devices (i.e., proactive plan), guideline (for type of critical situations) and investigation reports (i.e., documents about the rescue activity). It is noted that critical situation mitigation knowledge corpus can come from other users and/or various crowdsources. For example, table 1 and table 2 illustrates this concept of critical situation mitigation knowledge corpus. It is noted that this corpus can receive updates from various IoT sensor nodes which are streaming information in JSON format to the cloud database. And a standard mitigation plan with a baseline can be established beforehand if the corpus from online knowledge server 120 does not exist based on pre-defined rules (gathered from online scraping and user's preferences).

Figure 2:
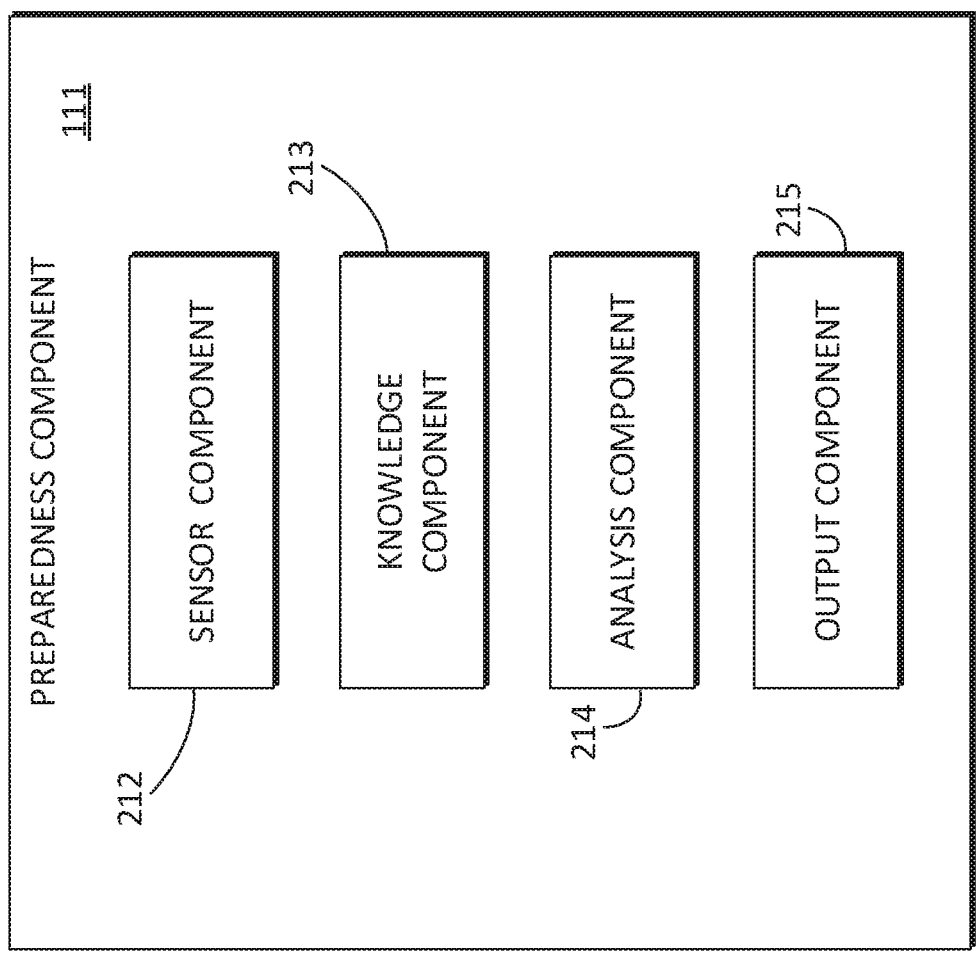
FIG. 2 is a functional block diagram illustrating preparedness component in accordance with an embodiment of the present invention.

FIG. 2 is a functional block diagram illustrating preparedness component 111 in accordance with an embodiment of the present invention. In the depicted embodiment, preparedness component 111 includes sensor component 212, knowledge component 213, analysis component 214 and output component 215.

A few use case scenarios will be used as an example to illustrate an embodiment of the various sub-components of preparedness component 111 and does not restricted other embodiments and forms of use. Scenario 1, Family1 lives in the suburbs in a home IoT devices and home automation/security system. Family1 has four family members and the house is a two-story house with a basement. The critical situation is an imminent home invasion in the middle of the night.

Scenario 2, Family2, lives in the city condo equipped with IoT devices and home automation system. Family2 has two family members and there is one single floor for the condo, situated in a three-story building. The critical situation is there is a fire in the kitchen.

As is further described herein below, sensor component 212, of the present invention provides the capability of communicating to IoT device 103 including receiving data and sending data. For example, sensor component 212 can receive images from an IoT video camera and door sensor. In another example, sensor component 212 can send commands to an IoT speaker in the house to broadcast a message. Using Scenario 1 (i.e., home invasion), sensor component 212 (i.e., front door video camera) detected unfamiliar/unregistered faces of people (i.e., would-be robbers/intruders) at the front door and the front door sensor indicates that the front door is open. Furthermore, sensor component 212, through the front door camera (via image/object detection), may recognize weapons carried by the intruders.

In another example, using Scenario 2 (i.e., fire), sensor component 212 (e.g., smoke detector, carbon monoxide detector, etc.) detects smoke from the kitchen.

In another embodiment, sensor component 212, can received data (e.g., warning and/or alerts) from online knowledge server 120. For example, a weather server can push alerts/warning to sensor component 212 regarding a tornado alert approaching the smart home controlled by preparedness component 111.

As is further described herein below, knowledge component 213 of the present invention provides the capability of communicating (e.g., querying, downloading, etc.) to one or more knowledge base servers that contain information related to, but is not limited to, user-based knowledge corpus, critical situation mitigation knowledge corpus, weather and traffic servers. In other embodiments, knowledge component 213 can store and update user-based knowledge corpus and critical situation mitigation knowledge corpus on a database (i.e., database 116).

Continuing with Scenario 1, knowledge component 213 may pull historical records of activities (i.e., user-based knowledge corpus) of the occupant of the house to ascertain which room they may be located and/or ascertain occupant location based on wearable devices and/or proximity sensors. Furthermore, knowledge component 213 may connect to online knowledge server 120 to query first response/solutions (see Table 1) associated with general home invasion scenarios.

Continuing with Scenario 2, knowledge component 213 may pull historical records of activities (i.e., user-based knowledge corpus) of the occupant of the house to ascertain which room they may be located and/or ascertain occupant location based on wearable devices and/or proximity sensors. Furthermore, knowledge component 213 may connect to online knowledge server 120 to query first response/solutions (see Table 2) associated with fire scenarios.

As is further described herein below, analysis component 214, of the present invention provides the capability of analyzing the current critical situation and develop one or more solutions (i.e., risk mitigation action plans) to address the situation, leveraging AI. For example, during a certain critical situation such as power outage, not all building systems can run during the situation. Thus, analysis component 214 can analyze various variables such as, but is not limited to, situation mitigation knowledge corpus, user-based knowledge corpus, IoT sensors, weather forecast, traffic forecast and emergency broadcast/warnings. Once, the variables have been analyzed, analysis component 214 can i) identify the critical situation, ii) create one or more solutions (i.e., risk mitigation action plans) associated with the critical situation, and iii) assign a weighted criterion to the critical situation and/or the one or more solutions (i.e., risk mitigation action plans). Furthermore, analysis component 214 can identify an optimal solution/plan after considering the weighted criteria of the solutions (i.e., risk mitigation action plans) based on combinatorial optimization technique (such as knapsack problem, rucksack problem, etc.). Combinatorial optimization technique is defined in the field of operations research, applied mathematics and theorical computer science, as a technique that consists of finding optimal objects from a finite set of objects. An example of an algorithm can be used by analysis component 214 to determine the probability/risk index related to the mitigation activity associated with the critical situation.

It is noted that certain solutions may carry a risk index/score ranging from 0 to 10 (i.e., 10 being the riskiest). Thus, certain solutions maybe riskier than other solutions to address the critical situation (see Table 3). Additionally, maximizing the plan to run during a disaster while being constrained by the riskiness of a system working correctly is taken into consideration by analysis component 214. It is further noted that risk of bodily harm and even death of occupants may be considered in the analysis and/or weighting of each action plan/steps.

In another embodiment, analysis component 214, can determine an optimal plan from the various risk mitigation action plans based on a user selectable risk threshold instead of relying on combinatorial optimization technique. For example, a threshold is set to a value of "5". If an action/step of the risk mitigation plan has a weighted risk rating over "5" then analysis component 214 can consider that plan not part of the optimal plan (i.e., too risky). It is noted that the threshold can be dynamically adjusted by the machine learning aspect of analysis component 214 as the embodiment learns and evolves over time. It is noted that the term, "optimal plan", refers to one or several actions/plans that has been selected based on the various risk mitigation plans devised by the embodiment.

In yet another embodiment, analysis component 214, can, by machine learning or the user/administrator, initially set the weighted risk score randomly set or pre-defined based on the baseline/crowdsourced ruleset. Weighted risk score can be learnt based on the monitoring the reactions (i.e., fetched through wearables and IoT sensor nodes) in certain situations. Thus, the embodiment is trained in a proactive manner. Furthermore, as part of feedback learning, the output is updated based on the learnt weights. For example, the weighing are trained based on custom models wherein the weighing are personalized for every user based on their characteristics and implicit feedback.

It is further noted that the risk score can be assigned, by machine learning, based on the profile of the users wherein certain characteristics of the user is considered. For example, the physical disability, velocity/speed to act, time taken to execute certain security instructions etc. can be used as criteria. Thus, there's a trade-off scheme that balances the severity of the problem vs the profiling of the user and/or compared to other user's in the same scenario/situations (i.e., crowdsourcing).

For example, continuing with Scenario 1, analysis component 214 may recognize that a home invasion is in progress based on information from sensor component 212. Furthermore, embodiment may formulate and execute a risk mitigation plan based on the user-based knowledge corpus and critical situation mitigation knowledge corpus. Based on information from knowledge component 213, analysis component 214 recognize that two occupants (parents) are sleeping upstairs, one occupant (daughter) is sleeping upstairs while the last occupant (son) is in the basement playing video games. Analysis component 214 may formulate one or more risk mitigation solutions, leveraging AI and/or combinatorial optimization technique, based on the available knowledge: i) current information on the whereabouts of the occupant of the house and intruders, ii) existing IoT devices in the house, iii) existing mobile and/or wearable devices of the occupants. For example, a risk migration solution for scenario 1 could be the following: a) may alert law enforcement personnel including sending location and video feed from the exterior and interior video cameras, b) may include sending a command to lock all interior doors (e.g., bedrooms, etc.) to prevent further ingress of intruders towards the sleeping family members, c) playing an alarm sound throughout the entire house and d) may alert (e.g., via mobile devices or wearable devices, etc.) the users (e.g., parents and children) in the house of the critical situation.

TABLE 3

| Solution activity | Risk index (0-10) |
|---|---|
| alert law enforcement personnel | 1 |
| sending location and video feed from the exterior and interior video cameras | 1 |
| playing an alarm sound throughout the entire house | 8 |
| sending a command to lock all interior doors | 1 |

For example, continuing with Scenario 2, analysis component 214 may recognize that a kitchen fire is in progress based on information from sensor component 212. Furthermore, embodiment may formulate and execute a risk mitigation plan based on the user-based knowledge corpus and critical situation mitigation knowledge corpus. Based on information from knowledge component 213, analysis component 214 recognize that two occupants are in the bedroom getting ready for work after finishing breakfast. The occupants forgot to turn the stove off after making breakfast since they woke up late. Analysis component 214 may formulate one or more risk mitigation solutions, leveraging AI and/or combinatorial optimization technique, based on the available knowledge: i) current information on the whereabouts of the occupant of the house and intruders, ii) existing IoT devices in the house, iii) existing mobile and/or wearable devices of the occupants. For example, a risk migration solution for scenario 2 could be the following: a) turn on fire suppression system in the kitchen, b) alert the occupants of the fire via wearable and/or mobile devices, c) alert occupants via the speakers and d) call the fire department.

TABLE 4

| Solution activity | Risk index (0-10) |
| --- | --- |
| turn on fire suppression | 1 |
| alert the occupants of the fire via wearable and/or mobile devices | 1 |
| playing an alarm sound throughout the entire house | 1 |
| call the fire department | 1 |

As is further described herein below, output component 215, of the present invention provides the capability of executing the optimal solution based on the result from analysis component 214. Output component 215 has the capability of communicating to one or more action devices (i.e., existing electronic devices such as, IoTs, PC, mobile devices, home security/automation system, HVAC, etc.) and performing one or more actions (e.g., send a text, send an email, activate a IoT lamp, open/lock IoT locking mechanism, live stream a video feed to occupants, turn on HVAC, etc.). Based on the risk index assigned to each risk mitigation solution, analysis component 214, through analysis component 214, may pick the optimal risk mitigation solution and send the solution to output component 215. Output component 215 can execute one or all risk mitigation solutions. For example, using the risk solution from Scenario 1 (i.e., a-d), analysis component 214 decides to execute all available solutions. Thus, output component 215, through sensor component 212, may send commands to action IoT devices such as, i) IoT video cameras to transmit video footage (live and/or recorded) to the authority (i.e., police), ii) IoT locking devices to lock interior doors where the occupants are located (e.g., lock bedroom of the parents and daughter, lock the basement door), and iii) to the IoT speakers to play an alarm sound throughout the house and iv) IoT messaging device to alert the occupants (e.g., via mobile devices or wearable devices, etc.) in the house of the critical situation. In another embodiment, analysis component 214 may not choose solution c) since analysis component 214 may deem that (playing an alert tone over the house speaker) task too risky in case the intruders may rush to harm the occupant before the police arrives.

In another example, using the risk solution from Scenario 2 (i.e., a-d), analysis component 214 decides to execute all available solutions.

In other embodiments, preparedness component 111 can be summarized by the following approach: i) remote home automation/security service provider will historically be gathering different types of IoT, camera feed, investigation reports, documents, evacuation plan, rescue operation steps, sequence of activities are performed on different types rescue operation or addressing any critical situation etc. and accordingly, machine learning will be performed to create a knowledge corpus by correlating types of critical situation, proactive or reactive mitigation steps performed, execution of activities are to be done etc., ii) IoT, camera or various other repute source information will be analyzed to predict or detect any critical situation with the gravity of the critical situation, and accordingly home automation system will be using the knowledge corps and executing appropriate mitigation steps in one or more devices and communicating appropriate notification to the user. So that home can be made safe during the critical situation, iii) By analyzing the input feed, if the home automation system identifies any critical situation, then home automation system will be connecting to critical situation mitigation knowledge corpus along with user's usage-based knowledge corpus. So that user specific appropriate mitigation action can be executed, and iv) home automation system will be analyzing the input feed to predict or detect type of critical situation, and gravity of critical situation, and accordingly will be identify when the mitigation activities are to be executed and how long the mitigation activities are to be ensured, so that the home can be made safe.

Figure 3:
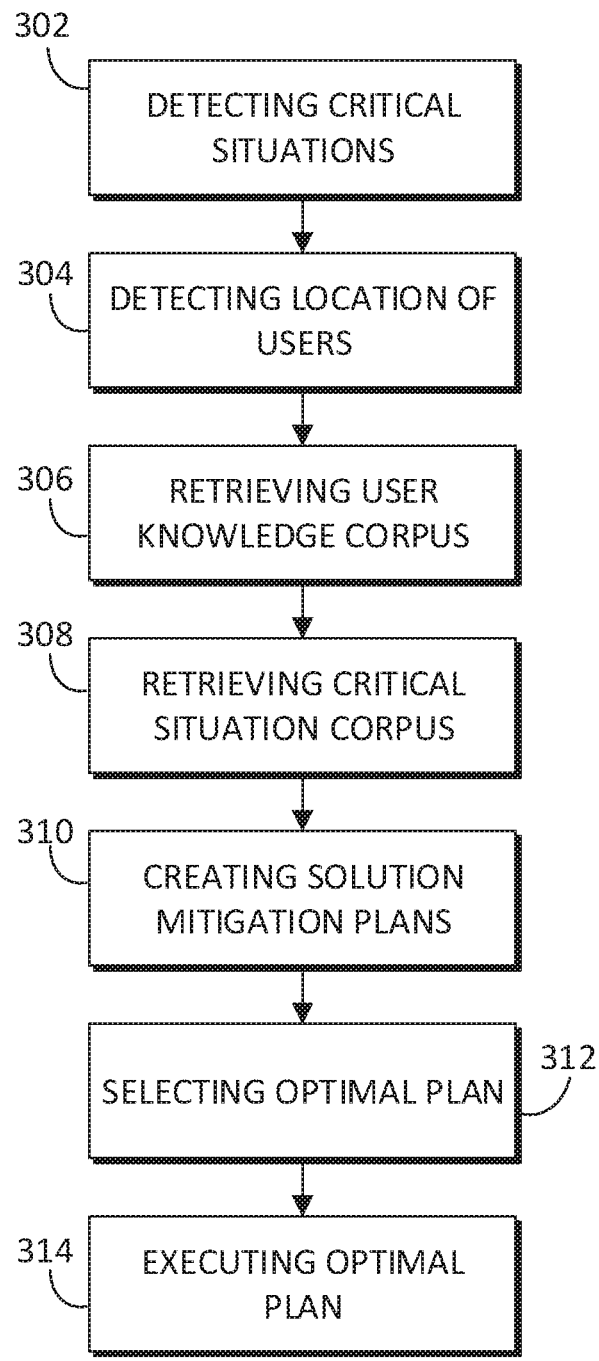
FIG. 3 is a flowchart illustrating the operation of preparedness component 111, designated as 300, in accordance with an embodiment of the present invention.

FIG. 3 is a flowchart illustrating an alternative operation of preparedness environment 100, designated as 300, in accordance with another embodiment of the present invention.

Preparedness component 111 detect critical situations (step 302). In an embodiment, preparedness component 111, through sensor component 212, detects one or more critical situation. For example, using Scenario 1, sensor component 212 detects intruders (through the front doorbell video camera) and the front door sensor indicating an open door.

Preparedness component 111 detect locations of users (step 304). In an embodiment, preparedness component 111, through sensor component 212, detects the location of all users in the structure. For example, using Scenario 1, sensor component 212 detects the parents sleeping in the master bedroom, the daughter sleeping in her room and the son playing games in the basement. It is noted that preparedness component 111 can use historical analysis to determine the location of occupants if there are no IoT devices that can directly observe and verify/validate the occupants and their location.

Preparedness component 111 retrieves user knowledge corpus (step 306). In an embodiment, preparedness component 111, retrieves data (e.g., historical patterns/trends or live data associated with users) from various sources such as knowledge server and IoT database. For example, using Scenario 1 preparedness component 111, through knowledge component 213, can retrieve information based on user-based knowledge corpus from database 116 and sensor component 212.

Preparedness component 111 retrieves critical situation corpus (step 308). In an embodiment, preparedness component 111, retrieves the critical situation corpus from a database. For example, using Scenario 1 preparedness component 111, through knowledge component 213, can retrieve critical situation corpus from online knowledge server 120.

Preparedness component 111 creates solution mitigation plans (step 310). In an embodiment, preparedness component 111, through analysis component 214, creates one or more solution mitigation plans based on the gathered data. For example, using Scenario 1, analysis component 214 creates the following risk mitigation steps including weighted risk score (see Table 3): a) may alert law enforcement personnel including sending location and video feed from the exterior and interior video cameras, b) may include sending a command to lock all interior doors (e.g., bedrooms, etc.) to prevent further ingress of intruders towards the sleeping family members, c) playing an alarm sound throughout the entire house and d) may alert (e.g., via mobile devices or wearable devices, etc.) the users (e.g., parents and children) in the house of the critical situation.

Preparedness component 111 selecting optimal plan (step 312). In an embodiment, preparedness component 111, through analysis component 214, identify optimal plan from one or more solution mitigation plans. For example, using Scenario 1, based on the risk score (Table 3), analysis component 214 determine that risk mitigation solution of a-d would be the optimal solution to the critical situation.

Preparedness component 111 execute optimal plan (step 314). In an embodiment, preparedness component 111, execute optimal plan. For example, using Scenario 1, output component 215 executes steps a-d to address the critical situation.

Figure 4:
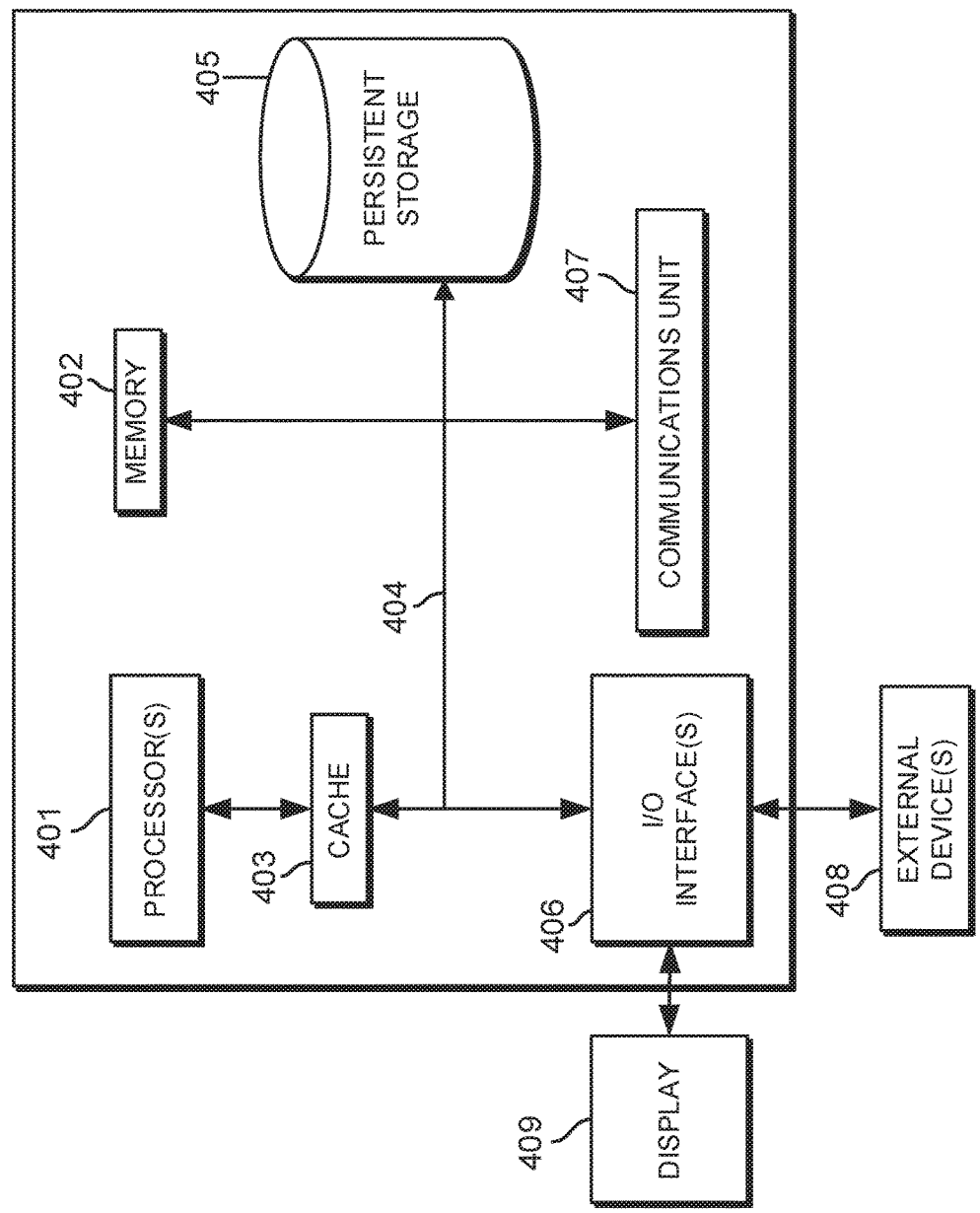
FIG. 4 depicts a block diagram, designated as 400, of components of a server computer capable of executing the preparedness component 111 within the preparedness environment, of FIG. 1, in accordance with an embodiment of the present invention.

FIG. 4 depicts a block diagram of components of preparedness component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Preparedness component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., Preparedness component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., preparedness component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for identifying mitigation solution based on critical situations, the computer-implemented method comprising:
   detecting one or more critical situations associated within a structure;
   detecting one or more location of one or more users in the structure;
   retrieving a user-knowledge corpus based on one or more smart IoT devices from a first database;
   retrieving a critical situation knowledge corpus from a second database;
   creating one or more risk mitigation action plans to address the one or more critical situations; wherein creating one or more risk mitigation action plan based on the one or more critical situations comprises:
   analyzing the user-knowledge corpus and the critical situation knowledge corpus related to the one or more critical situations;

creating one or more risk mitigation action plans based on the analyzed user knowledge corpus and critical situation knowledge corpus;
assigning weighted risk scores to the one or more risk mitigation action plans;
selecting an optimal plan, by leveraging machine learning through combinatorial optimization technique, from the one or more risk mitigation action plans; and
executing the optimal plan.

2. The computer implemented method of claim 1, wherein detecting one or more critical situations within the structure comprises:
receiving sensor data from the one or more IoT sensors; and
receiving warning data from the one or more knowledge servers.

3. The computer implemented method of claim 1, wherein retrieving the user-knowledge corpus based on the one or more smart IoT devices from the first database comprises:
identifying a usage pattern one or more users in the structure based on the one or more smart IoT devices, wherein the usage pattern comprises of one or more activities and wherein the one or more activities comprises of a type and sequence and wherein the one or more smart IoT devices comprises a location of the one or more IoT devices and dependency amongst the one or more IoT devices.

4. The computer implemented method of claim 1, wherein retrieving the critical situation knowledge corpus separate from the one or more servers from the second database comprises:
connecting to the one or more servers;
querying the one or more servers for data related to the one or more critical situations;
responsive to an empty query of the critical situation knowledge corpus, creating a new critical situation knowledge corpus; and
downloading the data, wherein the data comprise of information from IoT devices, camera feeds, investigation reports, evacuation plans, rescue operation steps and guidelines for one or more types of critical situations.

5. The computer implemented method of claim 1, wherein selecting an optimal plan, by leveraging machine learning through the use of combinatorial optimization technique, from the one or more risk mitigation action plans comprises:
determining whether the weighted score of the one or more risk mitigation action plan exceeds a risk threshold; and
responsive to determining that the one or more risk mitigation action plan does not exceed the risk threshold, selecting the one or more risk mitigation action plan as the optimal plan.

6. The computer implemented method of claim 1, wherein executing the optimal plan comprises:
transmitting to an output component to execute the optimal plan, wherein the output component communicates to one or more action devices comprises of IoT lamps, HVAC, home automation/security system, PC, mobile devices and speakers.

7. A computer program product for identifying mitigation solution based on critical situations, the computer program product comprising:
one or more computer readable storage media and program instructions stored on the one or more computer readable storage media, the program instructions comprising:
program instructions to detect one or more critical situations associated within a structure;
program instructions to detect one or more location of one or more users in the structure;
program instructions to retrieving a user-knowledge corpus based on one or more smart IoT devices from a first database;
program instructions to retrieve a critical situation knowledge corpus from a second database;
program instructions to create one or more risk mitigation action plans to address the one or more critical situations;
wherein program instructions to create one or more risk mitigation action plan based on the one or more critical situations comprises:
program instructions to analyze the user-knowledge corpus and the critical situation knowledge corpus related to the one or more critical situations;
program instructions to create one or more risk mitigation action plans based on the analyzed user knowledge corpus and critical situation knowledge corpus; and
program instructions to assigning weighted risk scores to the one or more risk mitigation action plans;
program instructions to select an optimal plan, by leveraging machine learning through combinatorial optimization technique, from the one or more risk mitigation action plans; and program instructions to execute the optimal plan.

8. The computer program product of claim 7, wherein program instructions to detect one or more critical situations within the structure comprises:
program instructions to receive sensor data from the one or more IoT sensors; and
program instructions to receive warning data from the one or more knowledge servers.

9. The computer program product of claim 7, wherein program instructions to retrieve the user-knowledge corpus based on the one or more smart IoT devices from the first database comprises:
program instructions to identify a usage pattern one or more users in the structure based on the one or more smart IoT devices, wherein the usage pattern comprises of one or more activities and wherein the one or more activities comprises of a type and sequence and wherein the one or more smart IoT devices comprises a location of the one or more IoT devices and dependency amongst the one or more IoT devices.

10. The computer program product of claim 7, wherein program instructions to retrieve the critical situation knowledge corpus separate from the one or more servers from the second database comprises:
program instructions to connect to the one or more servers;
program instructions to query the one or more servers for data related to the one or more critical situations;
responsive to an empty query of the critical situation knowledge corpus, program instructions to create a new critical situation knowledge corpus; and
program instructions to download the data, wherein the data comprise of information from IoT devices, camera feeds, investigation reports, evacuation plans, rescue operation steps and guidelines for one or more types of critical situations.

11. The computer program product of claim 7, wherein program instructions to select an optimal plan, by leveraging machine learning through the use of combinatorial optimization technique, from the one or more risk mitigation action plans comprises:
    program instructions to determine whether the weighted score of the one or more risk mitigation action plan exceeds a risk threshold; and
    responsive to program instructions to determine that the one or more risk mitigation action plan does not exceed the risk threshold, program instructions to select the one or more risk mitigation action plan as the optimal plan.

12. The computer program product of claim 7, wherein program instructions to execute the optimal plan comprises:
    program instructions to transmit to an output component to execute the optimal plan, wherein the output component communicates to one or more action devices comprises of IoT lamps, HVAC, home automation/security system, PC, mobile devices and speakers.

13. A computer system for identifying mitigation solution based on critical situations, the computer system comprising:
    one or more computer processors;
    one or more computer readable storage media;
    program instructions stored on the one or more computer readable storage media for execution by at least one of the one or more computer processors, the program instructions comprising:
    program instructions to detect one or more critical situations associated within a structure;
    program instructions to detect one or more location of one or more users in the structure;
    program instructions to retrieving a user-knowledge corpus based on one or more smart IoT devices from a first database;
    program instructions to retrieve a critical situation knowledge corpus from a second database;
    program instructions to create one or more risk mitigation action plans to address the one or more critical situations;
    wherein program instructions to create one or more risk mitigation action plan based on the one or more critical situations comprises:
    program instructions to analyze the user-knowledge corpus and the critical situation knowledge corpus related to the one or more critical situations;
    program instructions to create one or more risk mitigation action plans based on the analyzed user knowledge corpus and critical situation knowledge corpus;
    program instructions to assigning weighted risk scores to the one or more risk mitigation action plans;
    program instructions to select an optimal plan, by leveraging machine learning through combinatorial optimization technique, from the one or more risk mitigation action plans; and program instructions to execute the optimal plan.

14. The computer system of claim 13, wherein program instructions to detect one or more critical situations within the structure comprises:
    program instructions to receive sensor data from the one or more IoT sensors; and
    program instructions to receive warning data from the one or more knowledge servers.

15. The computer system of claim 13, wherein program instructions to retrieve the user-knowledge corpus based on the one or more smart IoT devices from the first database comprises:
    program instructions to identify a usage pattern one or more users in the structure based on the one or more smart IoT devices, wherein the usage pattern comprises of one or more activities and wherein the one or more activities comprises of a type and sequence and wherein the one or more smart IoT devices comprises a location of the one or more IoT devices and dependency amongst the one or more IoT devices.

16. The computer system of claim 13, wherein program instructions to retrieve the critical situation knowledge corpus separate from the one or more servers from the second database comprises:
    program instructions to connect to the one or more servers;
    program instructions to query the one or more servers for data related to the one or more critical situations;
    responsive to an empty query of the critical situation knowledge corpus, program instructions to create a new critical situation knowledge corpus; and
    program instructions to download the data, wherein the data comprise of information from IoT devices, camera feeds, investigation reports, evacuation plans, rescue operation steps and guidelines for one or more types of critical situations.

17. The computer system of claim 13, wherein program instructions to select an optimal plan, by leveraging machine learning through the use of combinatorial optimization technique, from the one or more risk mitigation action plans comprises:
    program instructions to determine whether the weighted score of the one or more risk mitigation action plan exceeds a risk threshold; and
    responsive to program instructions to determine that the one or more risk mitigation action plan does not exceed the risk threshold, program instructions to select the one or more risk mitigation action plan as the optimal plan.

\* \* \* \* \*